US008767419B2

United States Patent
Huang

(10) Patent No.: US 8,767,419 B2
(45) Date of Patent: Jul. 1, 2014

(54) FEEDBACK CIRCUIT WITH FEEDBACK IMPEDANCE MODULATION FOR IMPROVING POWER SAVING

(75) Inventor: Wei-Hsuan Huang, Taoyuan (TW)

(73) Assignee: System General Corp., Taipei Hsien (TW)

( * ) Notice: Subject to any disclaimer, the term of this patent is extended or adjusted under 35 U.S.C. 154(b) by 291 days.

(21) Appl. No.: 12/728,608

(22) Filed: Mar. 22, 2010

(65) Prior Publication Data

US 2011/0133829 A1 Jun. 9, 2011

Related U.S. Application Data

(60) Provisional application No. 61/266,546, filed on Dec. 4, 2009.

(51) Int. Cl.
*H02M 3/335* (2006.01)
(52) U.S. Cl.
USPC .................. 363/21.18; 323/283; 323/298
(58) Field of Classification Search
USPC ............. 323/282, 283, 284, 313, 285, 298; 327/538, 540, 541, 542, 543; 363/21.18
See application file for complete search history.

(56) References Cited

U.S. PATENT DOCUMENTS

| | | | | |
|---|---|---|---|---|
| 7,728,571 | B2 * | 6/2010 | Chuang et al. | 323/283 |
| 2009/0184701 | A1 * | 7/2009 | Yen | 323/283 |
| 2010/0097041 | A1 * | 4/2010 | Ayukawa et al. | 323/272 |
| 2011/0133829 | A1 * | 6/2011 | Huang | 327/590 |

* cited by examiner

*Primary Examiner* — Nguyen Tran
(74) *Attorney, Agent, or Firm* — Rosenberg, Klein & Lee

(57) ABSTRACT

A feedback circuit with feedback impedance modulation according to the present invention comprises a compare circuit, a counter and a switching resistor circuit. The compare circuit receives a feedback signal of a power converter to compare the feedback signal with a threshold signal for generating a control signal. The feedback signal is correlated to a load condition of the power converter. The counter is coupled to the compare circuit and generates a modulation signal in response to the control signal. The switching resistor circuit is coupled to the counter and a feedback loop of the power converter for modulating a feedback impedance of the power converter in response to the modulation signal. The feedback impedance is directly modulated from a lower resistance to a higher resistance when the load condition is reduced from a half/full-load to a no/light-load. The feedback impedance is gradually modulated from a higher resistance to a lower resistance when the load condition is increased from the no/light-load to the half/full-load.

10 Claims, 5 Drawing Sheets

FEEDBACK CIRCUIT WITH FEEDBACK IMPEDANCE MODULATION FOR IMPROVING POWER SAVING

BACKGROUND OF THE INVENTION

1. Field of the Invention

The present invention relates to power converters, and, more specifically, the present invention relates to the control of switching mode power converters.

2. Description of Related Art

Switching power converters have been widely used to provide regulated voltage and current. Based on the restriction of environmental pollution, power converters have been strived to meet the power management and energy conservation requirements. FIG. 1 shows a circuit schematic of a conventional power converter. A control circuit 10 generates a switching signal $V_{PWM}$ to regulate an output of the power converter in response to a feedback signal $V_{FB}$. The switching signal $V_{PWM}$ and the feedback signal $V_{FB}$ are generated at a drive terminal VG and a feedback terminal FB of the control circuit 10 respectively. The switching signal $V_{PWM}$ drives a power transistor $Q_1$ coupled to a power transformer $T_1$ for switching the power transformer $T_1$. The power transformer $T_1$ having a primary-side winding $N_P$ and a secondary-side winding $N_S$ is connected to an input voltage $V_{IN}$ of the power converter for energy store and power transferring. The stored energy of the power transformer $T_1$ is transferred to the output of the power converter through an output rectifier $D_O$ and an output capacitor $C_O$ for generating an output voltage $V_O$. A first terminal of the secondary-side winding $N_S$ is connected to an anode of the output rectifier $D_O$. A second terminal of the secondary-side winding $N_S$ is connected to the ground. The output capacitor $C_O$ is connected between a cathode of the output rectifier $D_O$ and the second terminal of the secondary-side winding $N_S$.

A sense resistor $R_S$ is connected in series with the power transistor $Q_1$ to generate a current signal $V_{CS}$ at a sense terminal CS of the control circuit 10 in response to a switching current $I_P$ of the power transformer $T_1$. Through an output resistor $R_O$ coupled to the output of the power converter, a zener diode $Z_O$ is coupled from the output voltage $V_O$ to an input of an opto-coupler OP1. A forward current $I_O$ is derived from the input of the opto-coupler OP1. An output of the opto-coupler OP1 is coupled to the feedback terminal FB of the control circuit 10 to form a feedback loop. A feedback current $I_{FB}$ is also derived from the output of the opto-coupler OP1. The pulse width of the switching signal $V_{PWM}$ is modulated in response to the feedback signal $V_{FB}$ to achieve the regulation of the power converter.

FIG. 2 shows a control circuit of the conventional power converter. The control circuit 10 includes a PWM circuit 100 and a feedback resistor $R_{FB}$. The PWM circuit 100 includes an oscillator (OSC) 110, a comparator 120, a D flip-flop 130, an inverter 140 and a logic circuit 150. The oscillator 110 is developed to generate a pulse signal PLS. A clock input ck of the D flip-flop 130 is coupled to the oscillator 110 to receive the pulse signal PLS. A supply voltage $V_{CC}$ is supplied to an input D of the D flip-flop 130. A first input of the logic circuit 150 is coupled to the oscillator 110 to receive the pulse signal PLS through the inverter 140 to limit the maximum duty cycle of the switching signal $V_{PWM}$. An output Q of the D flip-flop 130 is coupled to a second input of the logic circuit 150. The switching signal $V_{PWM}$ is generated at an output of the logic circuit 150. The D flip-flop 130 is enabled and the PWM circuit 100 generates the switching signal $V_{PWM}$ in response to the pulse signal PLS.

The comparator 120 has a positive input coupled to a reference voltage $V_{REF}$ though the feedback resistor $R_{FB}$. The feedback resistor $R_{FB}$ is coupled to the feedback loop. The positive input of the comparator 120 is also coupled to the feedback terminal FB of the control circuit 10 shown in FIG. 1 to receive the feedback signal $V_{FB}$ for the feedback loop control. The feedback signal $V_{FB}$ will be pulled high to the reference voltage $V_{REF}$ once the feedback loop and the output of the power converter are opened. A negative input of the comparator 120 is coupled to the sense terminal CS of the control circuit 10 shown in FIG. 1 to receive the current signal $V_{CS}$ for the pulse-width modulation control. An output of the comparator 120 is coupled to a reset input R of the D flip-flop 130 to reset the D flip-flop 130. The switching signal $V_{PWM}$ is disabled once the current signal $V_{CS}$ is higher than the feedback signal $V_{FB}$. However, the drawback of the prior art is that the feedback resistor $R_{FB}$ is the same resistance no matter what the load condition is. In addition, the power loss at the feedback resistor $R_{FB}$ is a constant from no-load to full-load condition. It will obviously cause large power consumption and increase the power saving at no-load and light-load. On the other hand, when the power converter operates at no-load and light-load, the feedback current $I_{FB}$ at the feedback terminal FB will source a larger current from the opto-coupler OP1, and it will consume much operation current in the control circuit 10.

In order to improve power saving, the feedback resistor $R_{FB}$ needs to be switched to modulate the feedback impedance in response to the load condition, that is to say, the resistance of the feedback resistor $R_{FB}$ will be reduced at full-load and the resistance of the feedback resistor $R_{FB}$ will be increased at no-load and light-load. Under the same transistor built in the opto-coupler OP1, if the feedback resistor $R_{FB}$ can be increased at no-load and light-load, the operation current in the control circuit 10 will be reduced. Furthermore, the forward current $I_O$ and feedback current $I_{FB}$ will also be decreased at the same time. Therefore, it will improve the power saving by switching the feedback resistor $R_{FB}$ to modulate the feedback impedance from a lower resistance to a higher resistance according to the load condition.

SUMMARY OF THE INVENTION

A feedback circuit with feedback impedance modulation is developed to reduce the power consumption of no-load and light-load conditions for power saving. It includes a compare circuit, a counter and a switching resistor circuit. The compare circuit receives a feedback signal of a power converter to compare the feedback signal with a threshold signal for generating a control signal. The feedback signal is correlated to a load condition of the power converter. The counter is coupled to the compare circuit and generates a modulation signal in response to the control signal. The switching resistor circuit is coupled to the counter and a feedback loop of the power converter for modulating a feedback impedance of the power converter in response to the modulation signal. The feedback impedance is directly modulated from a lower resistance to a higher resistance when the load condition is reduced from a half/full-load to a no/light-load. The feedback impedance is gradually modulated from a higher resistance to a lower resistance when the load condition is increased from the no/light-load to the half/full-load.

BRIEF DESCRIPTION OF THE DRAWINGS

The invention can be more fully understood by reading the subsequent detailed description and examples with references made to the accompanying drawings, wherein.

DESCRIPTION OF THE PREFERRED EMBODIMENTS

The following description is of the best-contemplated mode of carrying out the invention. This description is made for the purpose of illustrating the general principles of the invention and should not be taken in a limiting sense. The scope of the invention is best determined by reference to the appended claims.

Figure 1:
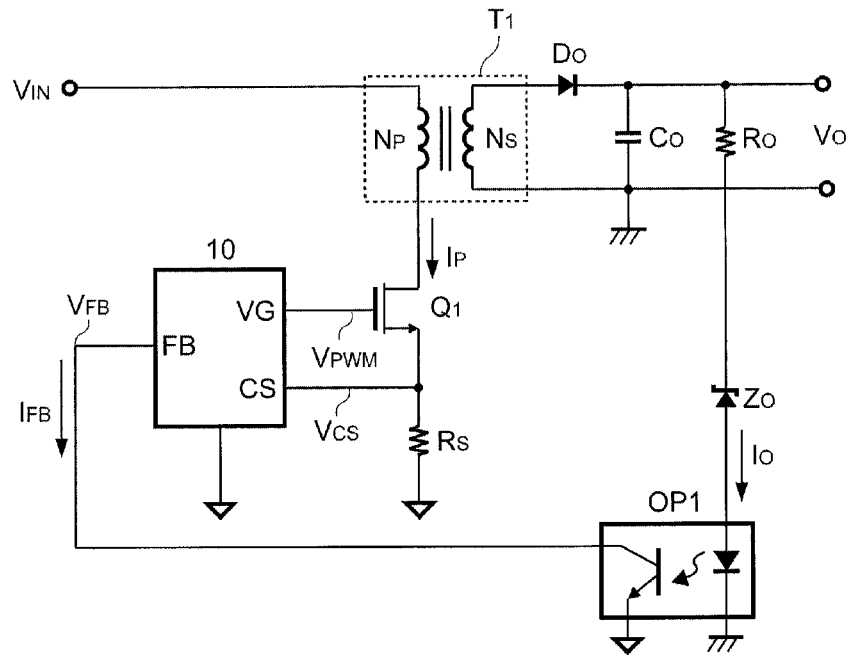
FIG. 1 shows a schematic diagram of a conventional power converter.
Figure 2:
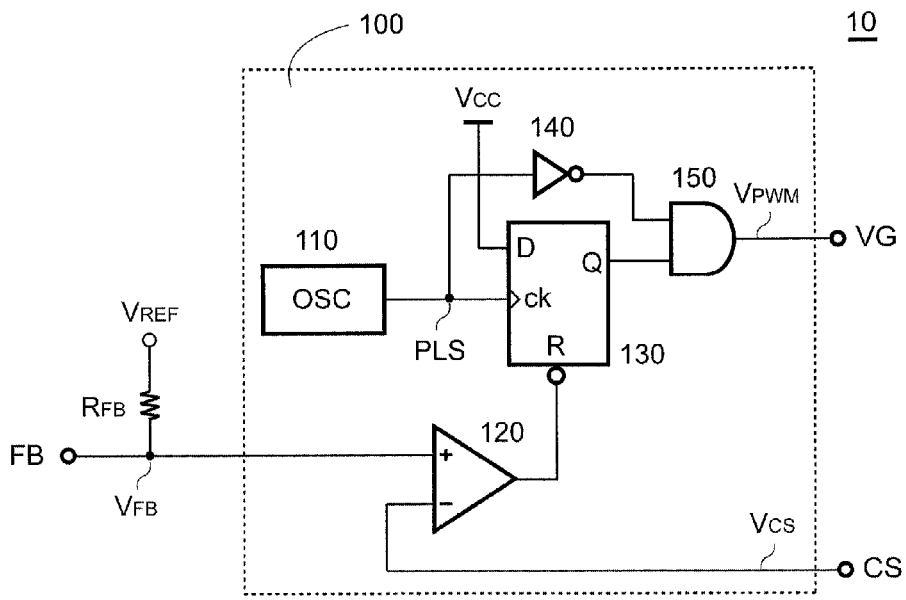
FIG. 2 shows a control circuit of the conventional power converter.
Figure 3:
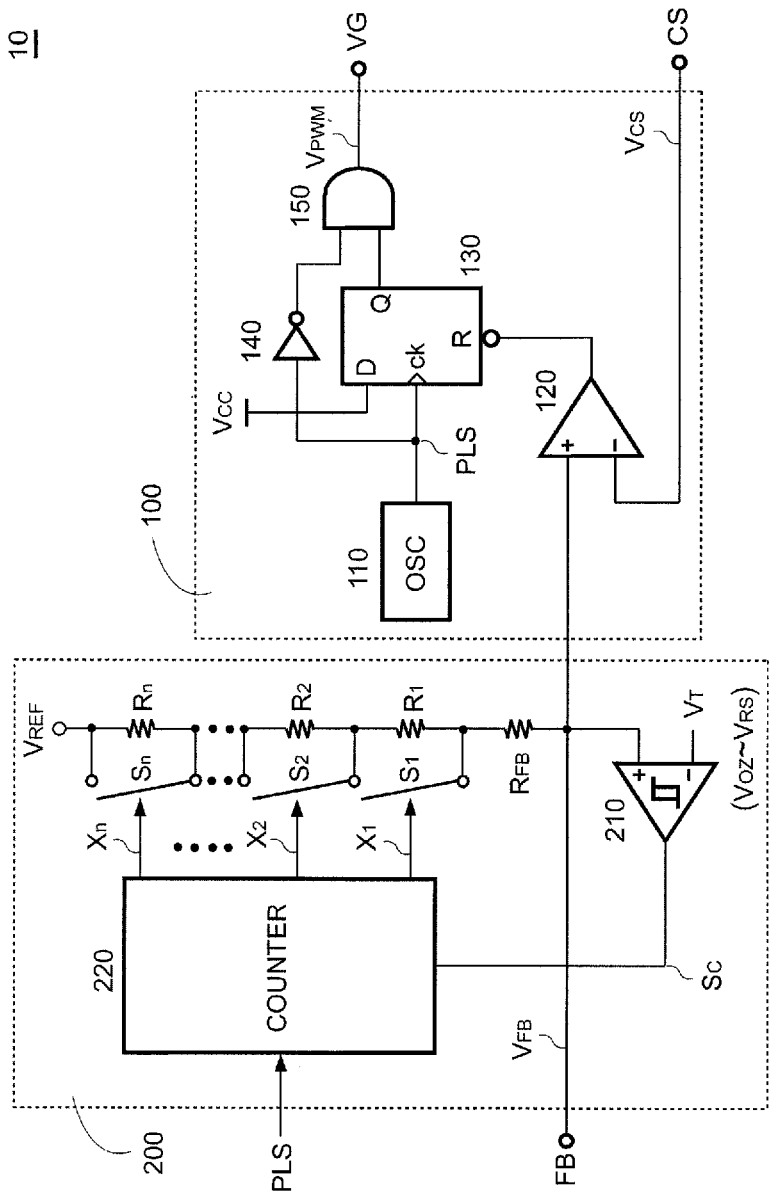
FIG. 3 shows a preferred embodiment of a control circuit of the power converter according to the present invention.

FIG. 3 shows a preferred embodiment of the control circuit 10 according to the present invention. The control circuit 10 includes a PWM circuit 100 and a feedback circuit 200. The PWM circuit 100 has mentioned above, so here is no need to describe again. The feedback circuit 200 includes a compare circuit 210, a counter 220 and a switching resistor circuit. The compare circuit 210 is implemented by a hysteresis comparator according to one embodiment of the present invention. A positive input of the compare circuit 210 coupled to the output of the power converter (shown in FIG. 1) receives the feedback signal $V_{FB}$ through the feedback terminal FB and the feedback loop of the power converter. The feedback signal $V_{FB}$ is correlated to the load condition of the power converter. A threshold signal $V_T$ is supplied to a negative input of the compare circuit 210. The threshold signal $V_T$ is arranged between a lower-limit $V_{OZ}$ and an upper-limit $V_{RS}$ (shown in FIG. 7). The compare circuit 210 is to compare the feedback signal $V_{FB}$ with the threshold signal $V_T$ for generating a control signal $S_C$. An output of the compare circuit 210 is coupled to the counter 220 to generate the control signal $S_C$.

The counter 220 is utilized to generate a modulation signal in response to the pulse signal PLS and the control signal $S_C$. The modulation signal is implemented by a digital pattern code [Xn, ..., $X_2$, $X_1$] according to one embodiment of the present invention. During the no/light-load, the control signal $S_C$ will be at a low-level when the feedback signal $V_{FB}$ is lower than the lower-limit $V_{OZ}$. During the half/full-load, the control signal $S_C$ will be at a high-level when the feedback signal $V_{FB}$ is higher than the upper-limit $V_{RS}$. The switching resistor circuit is coupled to the counter 220 and the feedback loop of the power converter for modulating the feedback impedance of the power converter in response to the digital pattern code [Xn, ..., $X_2$, $X_1$]. The switching resistor circuit comprises the feedback resistor $R_{FB}$ and switching-resistor sets connected to each other in series. The feedback resistor $R_{FB}$ has mentioned above, so here is no need to describe again. Wherein the switching-resistor sets are formed by resistors $R_1$, $R_2$, ..., Rn and switches $S_1$, $S_2$, ..., Sn. The resistors $R_1$, $R_2$, ..., Rn and the feedback resistor $R_{FB}$ are connected to each other in series. The switch $S_1$ and the resistor $R_1$ are connected in parallel. The switch $S_2$ and the resistor $R_2$ are connected in parallel. The switch Sn and the resistor Rn are connected in parallel and coupled to the reference voltage $V_{REF}$. Therefore, each of the switching-resistor sets comprises a resistor and a switch. The digital pattern code [Xn, ..., $X_2$, $X_1$] controls the switches $S_1$, $S_2$, ... Sn.

Figure 4:
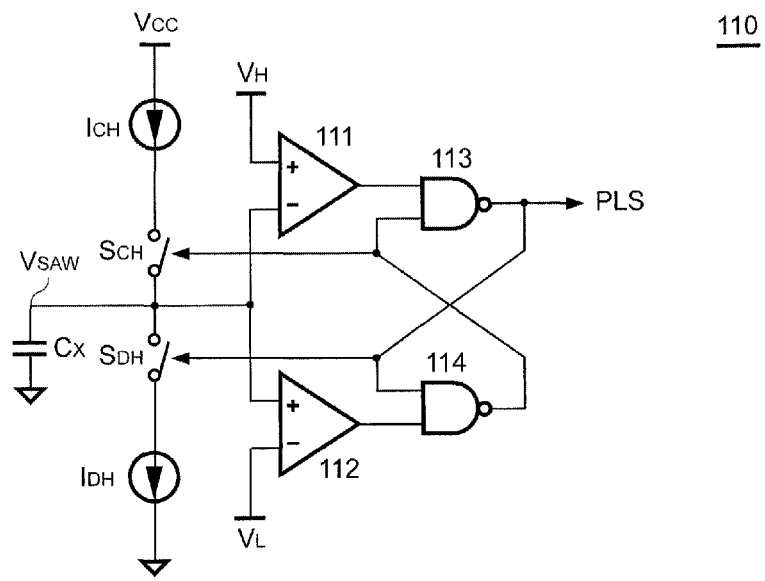
FIG. 4 shows a preferred embodiment of an oscillator according to the present invention.

FIG. 4 shows a circuit diagram of a preferred embodiment of the oscillator 110 of the PWM circuit 100 according the present invention. One terminal of a charge current $I_{CH}$ is coupled to the supply voltage $V_{CC}$. The other terminal of the charge current $I_{CH}$ is coupled to a charge switch $S_{CH}$ in series for charging a capacitor $C_X$. One terminal of a discharge current $I_{DH}$ is connected to a discharge switch $S_{DH}$ in series for discharging the capacitor $C_X$. The other terminal of the discharge current $I_{DH}$ is connected to the ground. A saw-tooth signal $V_{SAW}$ is therefore produced on the capacitor $C_X$. Comparators 111, 112 and NAND gates 113, 114 generate the pulse signal PLS to control the discharge switch $S_{DH}$. The pulse signal PLS is further supplied to the counter 220 (shown in FIG. 3).

Trip-point voltages $V_H$ and $V_L$ are connected to a positive input of the comparator 111 and a negative input of the comparator 112 respectively. A negative input of the comparator 111 and a positive input of the comparator 112 are coupled to the capacitor $C_X$ to receive the saw-tooth signal $V_{SAW}$. One input of the NAND gate 113 is coupled to an output of the comparator 111. The other input of the NAND gate 113 is coupled to control the charge switch $S_{CH}$. An output of the NAND gate 113 generates the pulse signal PLS. One input of the NAND gate 114 is coupled to an output of the comparator 112. The other input of the NAND gate 114 is coupled to the output of the NAND gate 113 for receiving the pulse signal PLS and coupled to control the discharge switch $S_{DH}$. An output of the NAND gate 114 is coupled to the other input of the NAND gate 113 and to control the charge switch $S_{CH}$. The saw-tooth signal $V_{SAW}$ thus swings between the trip-point voltage $V_H$ and $V_L$.

Figure 5:
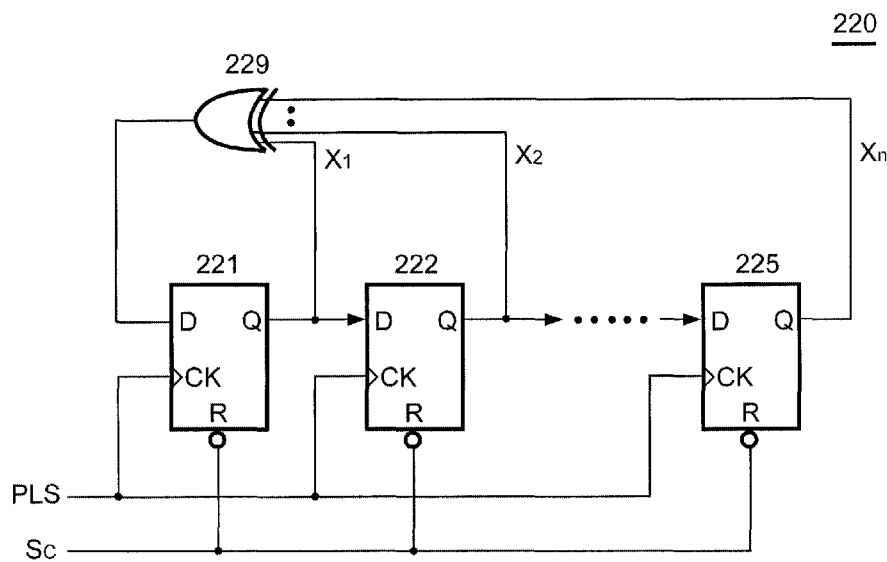
FIG. 5 shows a preferred embodiment of a counter according to the present invention.

FIG. 5 shows a circuit diagram of a preferred embodiment of the counter 220 of the feedback circuit 200 according to the present invention. The counter 220 comprises a plurality of registers 221, 222, ..., 225 and a logic circuit 229 to develop a linear shift register for generating a linear code in response to the pulse signal PLS and the control signal $S_C$. The logic circuit 229 can be implemented by a XOR gate according to one embodiment of the present invention. The registers 221, 222, ..., 225 can be served as a plurality of D flip-flops according to one embodiment of the present invention. The pulse signal PLS is supplied with a plurality of clock inputs CK of the registers 221, 222, ..., 225. A plurality of reset inputs R of the registers 221, 222, ..., 225 receive the control signal $S_C$. A plurality of outputs Q of the registers 221, 222, ..., 225 are coupled to a plurality of inputs of the XOR gate 229 to generate the digital pattern code [Xn, ..., $X_2$, $X_1$]. The digital pattern code [Xn, ..., $X_2$, $X_1$] controls the switches $S_1$, $S_2$, ..., Sn (shown in FIG. 3). An output of the XOR gate 229 is coupled to an input D of the first register 221. The registers 221, 222, ..., 225 are connected in series. The output Q of the first register 221 is coupled to an input D of the register 222. The output Q of the register 222 is coupled to an input D of the register 225. The inputs of the XOR gate 229 determine the polynomials of the linear shift register and decide the output of the linear shift register. Furthermore, the digital pattern code [Xn, ..., $X_2$, $X_1$] can be adopted from the part of the linear code to optimize the application.

As shown in FIG. 3, when the load condition is reduced from half/full-load to no/light-load and the feedback signal $V_{FB}$ is lower than the lower-limit $V_{oz}$ of the compare circuit 210, the reset inputs R of the registers 221, 222, ..., 225 receive the control signal $S_C$ to reset the registers 221, 222, ..., 225. The digital pattern code [Xn, ..., $X_2$, $X_1$] will be [0, ..., 0, 0] and the switches $S_1$, $S_2$, ..., Sn are turned off. The feedback impedance $Z_{FB}$ means a higher resistance and is the sum of the feedback resistor $R_{FB}$ and resistors $R_1$, $R_2$, ..., Rn. Besides, the higher resistance can be 50 Kohm according to one embodiment of the present invention.

Refer to FIG. 3, when the load condition is increased from no/light-load to half/full-load and the feedback signal $V_{FB}$ is higher than the upper-limit $V_{RS}$ of the compare circuit 210, the reset inputs [R] of the registers 221, 222, ..., 225 receive the control signal $S_C$ to modulate the digital pattern code [Xn, ..., $X_2$, $X_1$]. The digital pattern code [Xn, ..., $X_2$, $X_1$] controls the on/off status of the switches $S_1$, $S_2$, ... [,]Sn. The feedback impedance $Z_{FB}$ is gradually reduced from the higher resistance to a lower resistance (such as 50 Kohm, 49 Kohm, 48 Kohm, 47 Kohm, ..., 5 Kohm) Besides, the lower resistance can be 5 Kohm according to one embodiment of the present invention.

Figure 6:
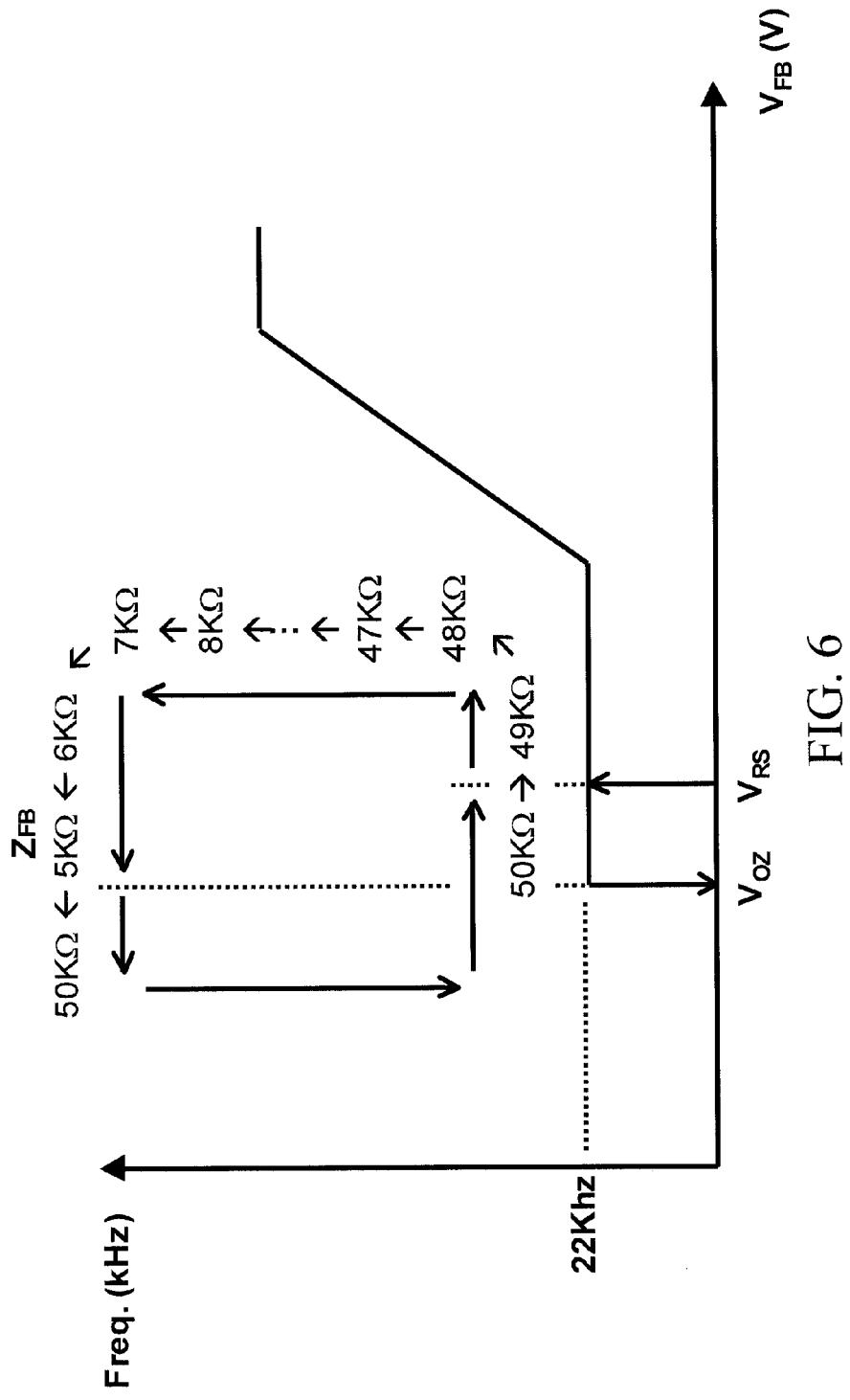
FIG. 6 shows the relationship of the switching frequency, the feedback signal and the feedback impedance according to the present invention.

FIG. 6 shows the relationship of the switching frequency $f_S$ of the switching signal $V_{PWM}$, the feedback signal $V_{FB}$ and the feedback impedance $Z_{FB}$ according the present invention. As mentioned earlier, the feedback impedance $Z_{FB}$ modulated at no-load and light-load can save the operation current of the control circuit (shown in FIG. 3) 10 and the forward current $I_O$ (shown in FIG. 1) of the output of the power converter for saving power. As shown in FIG. 3, when the load condition is reduced from half/full-load to no/light-load and the feedback signal $V_{FB}$ is lower than the lower-limit $V_{OZ}$ of the compare circuit 210, the feedback impedance $Z_{FB}$ is directly changed from the lower resistance to the higher resistance. The switching mode for switching the feedback impedance $Z_{FB}$ is also called a hard switching. At this time, the load has been reduced to enter a burst mode for power saving. The burst mode means the pulse width of the switching signal $V_{PWM}$ will be skipped when the power converters are always in regulation. The feedback loop will be unstable if the change of the feedback impedance $Z_{FB}$ is too large such as two-level switching. At no-load and during the burst mode, the feedback loop will be stable due to the forward current $I_O$ and the feedback current $I_{FB}$ are obviously reduced and the pulse width of the switching signal $V_{PWM}$ is almost to be zero. From half/full-load to no/light-load, there is no doubt that the hard switching can greatly save not only the forward current $I_O$ but also the feedback current $I_{FB}$ under the stable feedback loop.

Refer to FIG. 3, when the load condition is increased from no/light-load to half/full-load and the feedback signal $V_{FB}$ is higher than the upper-limit $V_{RS}$ of the compare circuit 210, the feedback impedance $Z_{FB}$ is gradually reduced from the higher resistance to the lower resistance (such as 50 Kohm, 49 Kohm, 48 Kohm, 47 Kohm, ..., 5 Kohm). The switching mode for switching the feedback impedance $Z_{FB}$ is also called a soft switching. As mentioned above, the feedback loop will be unstable if the change of the feedback impedance $Z_{FB}$ is too large such as two-level switching. From no-load or light-load to half-load or full-load, the forward current $I_O$ and the feedback current $I_{FB}$ will be increased suddenly if the feedback impedance $Z_{FB}$ is directly reduced from the higher resistance to the lower resistance, which causes the pulse width of the switching signal $V_{PWM}$ being increased suddenly and the feedback loop will be unstable. Owing to the soft switching from no/light-load to half/full-load, the pulse width of the switching signal $V_{PWM}$ can be gradually increased and the stable feedback loop can be also kept.

Figure 7:
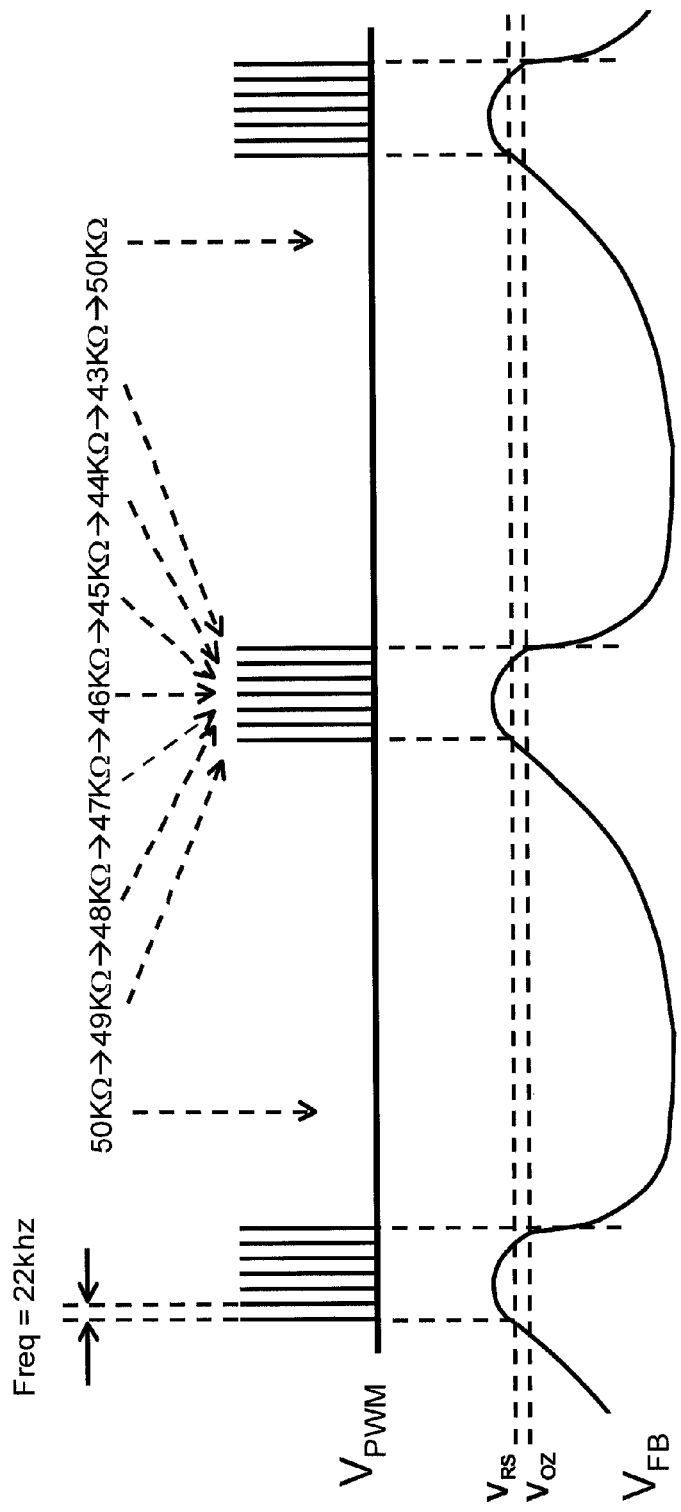
FIG. 7 shows the waveforms of the switching signal and the feedback signal according to the present invention.

FIG. 7 shows the waveforms of the switching signal $V_{PWM}$ and the feedback signal $V_{FB}$ according the present invention. As mentioned earlier, the burst mode will be generated for power saving when the load condition is at no-load and light-load. The burst mode means the pulse width of the switching signal $V_{PWM}$ will be skipped when the power converters are always in regulation. Refer to FIG. 3, when the load condition is reduced from half/full-load to no/light-load and the feedback signal $V_{FB}$ is lower than the lower-limit $V_{OZ}$ of the compare circuit 210, the power converter will operate in burst mode and the pulse width of the switching signal $V_{PWM}$ will be skipped. At this time, the feedback impedance $Z_{FB}$ is directly changed from the lower resistance to the higher resistance. The feedback loop will be stable due to the forward current $I_O$ and the feedback current $I_{FB}$ (shown in FIG. 1) are obviously reduced and the pulse width of the switching signal $V_{PWM}$ is almost to be zero. When the load condition is increased from no/light-load to half/full-load and the feedback signal $V_{FB}$ is higher than the upper-limit $V_{RS}$ of the compare circuit 210, the power converter will be normal operation and the pulse width of the switching signal $V_{PWM}$ will be cycle-by-cycle generated. At this time, the feedback impedance $Z_{FB}$ is gradually reduced from the higher resistance to the lower resistance (such as 50 Kohm, 49 Kohm, 48 Kohm, 47 Kohm, ..., 5 Kohm).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A feedback circuit with feedback impedance modulation comprising:
   a compare circuit receiving a feedback signal of a power converter to compare the feedback signal with a threshold signal for generating a control signal, wherein the feedback signal is correlated to a load condition of the power converter;
   a counter coupled to the compare circuit and generating a modulation signal in response to the control signal; and
   a switching resistor circuit coupled to the counter and a feedback loop of the power converter for modulating a feedback impedance of the power converter in response to the modulation signal;
   wherein, the feedback impedance is directly modulated from a lower resistance to a higher resistance by the switching resistor circuit and the feedback impedance is increased from the lower resistance directly to the higher resistance when the load condition is reduced from a half/full-load to a no/light-load.

2. The feedback circuit as claimed in claim 1, wherein the feedback impedance is directly modulated from a lower resistance to the higher resistance by the switching resistor circuit when the feedback signal is lower than a lower-limit of the threshold signal.

3. The feedback circuit as claimed in claim 1, wherein the feedback impedance is gradually modulated from a higher resistance to the lower resistance by the switching resistor circuit when the load condition is increased from a no/light-load to a half/full-load and the feedback signal is higher than a upper-limit of the threshold signal.

4. The feedback circuit as claimed in claim 1, wherein the switching resistor circuit comprises:
   a feedback resistor coupled to the feedback loop; and
   a plurality of switching-resistor sets connected to each other in series and connected in series with the feedback resistor, wherein the switching-resistor sets are switched by the modulation signal.

5. The feedback circuit as claimed in claim 4, wherein each of the switching-resistor sets comprises:
- a resistor connected in series with the feedback resistor; and
- a switch connected in parallel with the resistor and switched by the modulation signal.

6. The feedback circuit as claimed in claim 1, wherein the counter can be a linear shift register.

7. The feedback circuit as claimed in claim 6, wherein the linear shift register comprises:
- a plurality of registers connected to each other in series for generating the modulation signal in response to the control signal and a pulse signal of the power converter; and
- a logic circuit coupled to receive a plurality of outputs of the registers, an output of the logic circuit coupled to an input of a first register of the registers.

8. The feedback circuit as claimed in claim 7, wherein the outputs of the registers determine polynomials of the linear shift register and decide the output of the linear shift register.

9. The feedback circuit as claimed in claim 1, wherein the modulation signal can be a digital pattern code.

10. The feedback circuit as claimed in claim 1, wherein the compare circuit can be a hysteresis comparator.

* * * * *